N. E. STORMS.
REMOVABLE FURNACE OVEN.
APPLICATION FILED JUNE 12, 1907.
928,816.
Patented July 20, 1909.
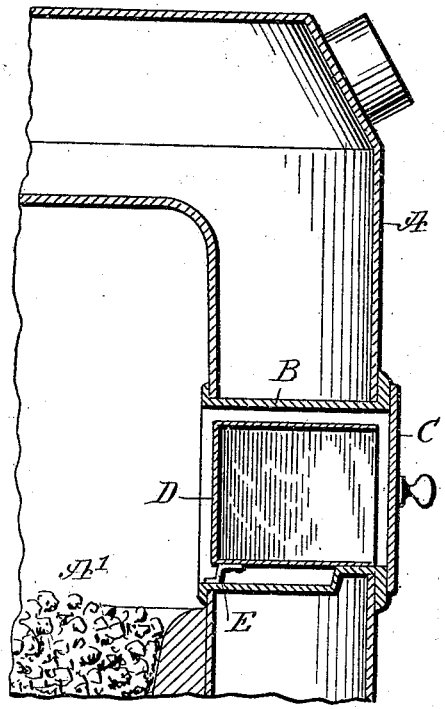
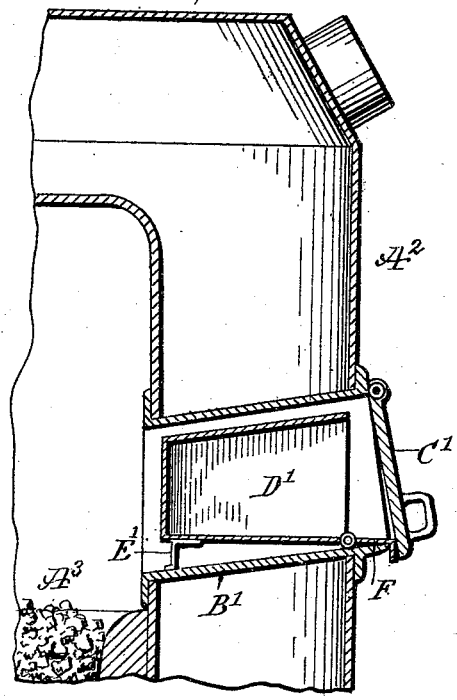
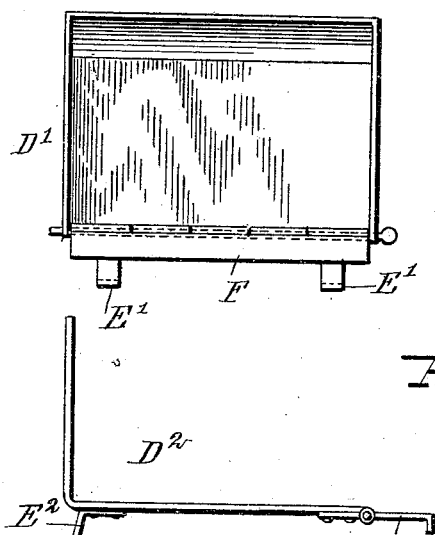
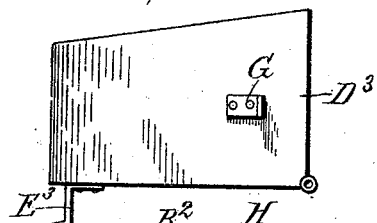
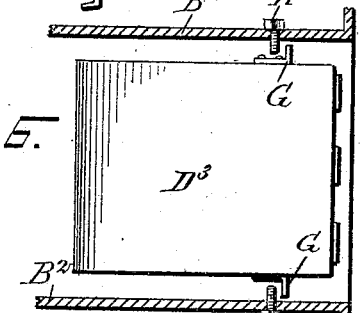
WITNESSES
H. Walker
INVENTOR
Newell E. Storms
BY Munn & Co
ATTORNEYS

UNITED STATES PATENT OFFICE.

NEWELL E. STORMS, OF MINNEAPOLIS, MINNESOTA.

REMOVABLE FURNACE-OVEN.

No. 928,816.             Specification of Letters Patent.            Patented July 20, 1909.

Application filed June 12, 1907. Serial No. 378,496.

*To all whom it may concern:*

Be it known that I, NEWELL E. STORMS, a citizen of the United States, and a resident of Minneapolis, in the county of Hennepin and State of Minnesota, have invented a new and Improved Removable Furnace-Oven, of which the following is a full, clear, and exact description.

The invention relates to hot air heaters and similar heating apparatus, and its object is to provide a new and improved oven for removable attachment to the furnace or regular heater, to permit using the oven for baking and other purposes, and without placing the oven and its contents directly over the burning fuel in the fire-box or subjecting the contents of the oven to the action of the obnoxious gases incident to burning of the fuel in the fire-box of the heater.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement as applied to a hot air furnace; Fig. 2 is a like view of the improvement as applied to a hot air furnace of a different construction; Fig. 3 is a front elevation of the improvement shown in Fig. 2; Fig. 4 is a side elevation of a modified form of the improved oven; Fig. 5 is a like view of another modified form of the improvement, and Fig. 6 is a plan view of the same in position in the entrance to the fire-box of the heater, the said entrance being shown in section.

The hot air heater or similar heating apparatus is provided with the usual outer shell A and a fire-box A' spaced from the outer shell A, to form an air passage, and into the fire-box A' leads the fire-box entrance B extending from the wall of the fire-box to the shell A, as plainly indicated in Fig. 1, the outer end of the entrance B being closed by a suitable door C. Into the entrance B is removably set an oven D for containing articles of food to be baked and the like, and the said oven D, as shown in Fig. 1, is in the form of a box open at the front end and extending with its back within a short distance of the rear end of the entrance B, the bottom of the box being provided with a foot E resting on the bottom of the entrance B, so as to hold the said bottom of the oven in a level position. The front end of the bottom rests on the front end of the bottom of the entrance B, the said entrance bottom having the usual drop, as indicated in Fig. 1, for the convenient introduction of fuel to be burned in the heater. Now by the arrangement described the oven D is held level in the entrance B, and the heat arising from the burning fuel readily heats the oven as well as the contents thereof, it being understood that the entrance B is kept heated by the rising hot air in the air space of the heater.

The oven D' illustrated in Fig. 2 is more particularly intended for a hot air heater having a fire-box entrance B' provided with an inclined bottom, and in this case the oven D' is provided with legs E' for holding the bottom of the oven level, and the front end of the bottom of the oven is provided with a hook F hooking onto the front edge of the bottom of the entrance B', to prevent the oven D' from sliding rearwardly and into the fire-box. As shown in the drawing the hook F is hinged to the front end of the bottom of the oven. The front end of the entrance B' projects slightly at the bottom and sides beyond the outer face of the shell A², and the said outer end of the entrance B' is closed by a drop door C' hinged at its upper end, as plainly shown in Fig. 2. The rear end or back of the oven D', which is in box-shape, is within the rear end of the entrance B', so that the contents of the oven are protected against the rising of obnoxious gases in the fire-box A³.

As shown in Fig. 4, the oven D² may be provided only with a bottom and a back, the bottom having legs E², to hold the bottom level in the fire-box entrance, and the bottom also having a hook F' to hold the oven against rearward sliding movement, as previously explained.

Instead of having the hook F or F' the sides of the oven D³, as shown in Figs. 5 and 6, may be provided with lugs G adapted to abut against the inner ends of bolts H screwed into the sides of the fire-box entrance B², so as to hold the oven D³ against accidental inward sliding.

Although I have shown and described several forms of oven and means for holding the bottom thereof level and means for holding the oven against inward movement, it is evident that other forms may be given to the said oven and the said means, without deviating from the spirit of my invention.

Having thus described my invention, I claim as new and desire to secure by Letters Patent:

1. The combination with a heater having a fire box entrance, the bottom of said entrance being lower at the inner or rear portion than at the front thereof, of an oven removably set in the entrance to the fire box, the rear end or back of the oven being within the rear end of the entrance, whereby the contents of the oven are protected against the gases in the fire box, legs on the rear part of the bottom of the oven to hold the bottom level when the oven is in the said entrance, and means connected with the forward part of the oven and engaging a part of the heater for holding the oven against inward movement.

2. The combination with a heater, of an oven removably set in the entrance to the fire box, the bottom of said entrance being lower at the rear portion than at the front, legs on the rear part of the bottom of the oven to hold the bottom level when the oven is in position in the said entrance, and coöperating means on the forward part of the oven and on the heater, for holding the oven against inward movement.

3. The combination with a heater, of an oven removably set in the entrance to the fire-box of the heater, the oven having a bottom and a back adjacent to the interior of the fire-box, and a hook hinged at the front end of the said bottom and adapted to hook onto the outer edge of the said entrance to hold the oven against inward sliding.

4. A heater having a fire-box, an outer shell and a tubular fire-box entrance connecting the shell with the wall of the fire-box, the bottom of said fire-box entrance being lower at its inner or rear portion than at its outer or front portion, in combination with an oven removably held in the said tubular entrance, the oven having a back located approximately at the inner end of the said entrance, means for holding the oven bottom level when the oven is in position in the said entrance, and means on the forward part of the oven engaging a part of the heater for holding the oven against inward movement.

5. An oven adapted to be removably inserted in the fire box entrance of a heater, the oven having a bottom and a back, legs on the rear part of the bottom of the oven for supporting the same, and a stop device hinged on the forward part of the oven.

6. An oven adapted to be removably inserted in the fuel passage of a heater, said oven comprising a baking chamber, legs for supporting the rear end of said chamber, and stop mechanism, substantially as described.

7. The combination of a heater provided with a fuel passage leading in from the side thereof, and an oven adapted to be removably supported on the bottom of said fuel passage, the rear end of said oven being provided with legs.

8. The combination of a heater provided with a fuel passage leading in from the side thereof, an oven adapted to be removably supported on the bottom of said fuel passage, the rear end of said oven being provided with legs, and stop mechanism for limiting the inward motion of said oven.

9. The combination with a heater provided with a fuel passage leading in from the side thereof, of an oven adapted to be removably supported on the bottom of said fuel passage, the inner or rear end of said oven being provided with supporting means for raising said end above the bottom of the fuel passage.

In testimony whereof I have signed my name to this specification in the presence of two subscribing witnesses.

NEWELL E. STORMS.

Witnesses:
GEO. F. EDWARDS,
EMMA M. LORD.